United States Patent [19]
Kaneko et al.

[11] 4,349,818
[45] Sep. 14, 1982

[54] ELECTROCHROMIC DISPLAY DEVICE

[75] Inventors: Noboru Kaneko; Junichi Tabata, both of Tokyo, Japan

[73] Assignee: Kabushiki Kaisha Daini Seikosha, Tokyo, Japan

[21] Appl. No.: 165,502

[22] Filed: Jul. 3, 1980

[30] Foreign Application Priority Data

Jul. 4, 1979 [JP] Japan .............................. 54-084860

[51] Int. Cl.$^3$ .............................................. G09G 3/34
[52] U.S. Cl. .................................. 340/785; 340/713; 350/357
[58] Field of Search ................. 340/785, 713; 350/357

[56] References Cited

U.S. PATENT DOCUMENTS

| | | | |
|---|---|---|---|
| 4,175,836 | 11/1979 | Redman et al. | 340/785 X |
| 4,181,406 | 1/1980 | Kohara et al. | 350/357 |
| 4,229,080 | 10/1980 | Take et al. | 350/357 |

*Primary Examiner*—David L. Trafton
*Attorney, Agent, or Firm*—Robert E. Burns; Emmanuel J. Lobato; Bruce L. Adams

[57] ABSTRACT

An electrochromic display device comprises; an electrolyte held between two substrates at least one of which is transparent. A display electrode is formed on a surface of one substrate and has an electrochromic substance film formed thereon, the surface being in contact with the electrolyte. A first counter electrode is formed on a counter surface of the other substrate in opposed spaced-apart relationship with respect to the display electrode, and a second counter electrode is formed on a face of either one of the substrates, the face being in contact with the electrolyte. Circuitry applies a first voltage between the display electrode and the first counter electrode to effect coloration of the display electrode, and applies a second voltage between the first and second counter electrodes to establish an electric field therebetween effective to remove a negative ion region which forms in the vicinity of the first counter electrode during coloration of the display electrode.

11 Claims, 12 Drawing Figures

ELECTROCHROMIC DISPLAY DEVICE

DETAILED DESCRIPTION OF THE INVENTION

The present invention relates to an electrochromic display device, and more particularly to a driving method to shorten the response time of the electrochromic display device, and to a panel and a driving circuit for realizing the driving method.

As used in this specification, an "electrochromic display device" is defined as a display device utilizing a substance which is colored or bleached in accordance with the transfer of electric charge between a counter electrode and a display electrode which are in contact with a suitable electrolyte. The substance described above will be referred to as an "electrochromic substance".

The conventional electrochromic display device will first be described followed by a description of the invention.

Figure 1:
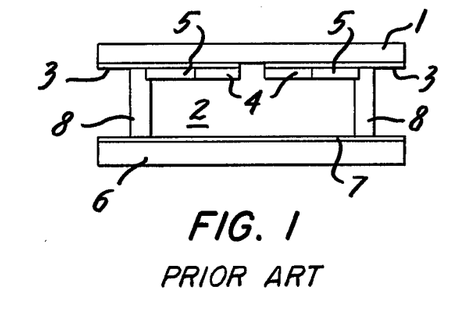
FIG. 1 illustrates a sectional view of the conventional electrochromic display panel.

FIG. 1 illustrates an arrangement of the conventional electrochromic display device. The panel is arranged in such a way that a transparent electrode 3 is formed on a face, which is in contact with an electrolyte 2 of a transparent substrate 1, by the evaporation of a conducting material such as $In_2O_3$, and an electrochromic substance film 4 formed by the evaporation of $WO_3$, $MoO_3$, etc. is disposed on the transparent electrode 3 in the form of a display picture element. Moreover, an insulating layer 5 for coating the region other than the region for connecting the transparent electrode to an outer circuit and to the pattern region of the display picture element, is formed on the electrode 3. An electrolyte 2 is continued in the space between the substrate and a substrate 6 which is spaced from the substrate 1 by spacers 8 and which has a counter electrode 7 made of Au or the like formed thereon. To obtain a display background, a powder of $TiO_2$ or the like is mixed with the electrolyte 2.

Figure 2:
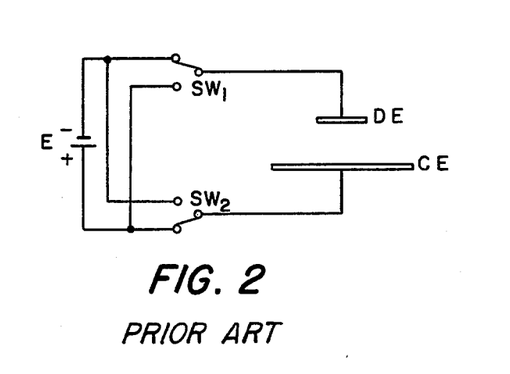
FIG. 2 is a circuit diagram for explaining the principle of the driving operation of the conventional panel.

The principle of the driving operation of the above described conventional electrochromic display panel will be now described in conjunction with FIG. 2. The transparent electrode 3 and the electrochromic substance film 4 shown in FIG. 1 are jointly referred to as a display electrode. Output terminals of switches $SW_1$ and $SW_2$ are connected to a display electrode DE and a counter electrode CE, respectively, and a power source E is connected to each input terminal of the switches $SW_1$ and $SW_2$. To produce colouration of the electrochromic substance film of the display electrode DE, the switch $SW_1$ connected to the display electrode DE is switched over to the minus terminal (−) of the power source E and the switch $SW_2$ connected to the counter electrode CE is switched over to the plus terminal (+) of the power source E. As a result, a current flows from the counter electrode CE to the display electrode DE so that the electrochromic substance film is reduced to produce colouration. On the other hand, to bleach the colored display electrode DE, the switch $SW_1$ connected to the display electrode DE is switched over to the plus terminal (+) of the power source E and the switch $SW_2$ connected to the counter electrode CE is switched over to the minus terminal (−) of the power source E. As a result, current flows from the display electrode DE to the counter electrode CE so that the electrochromic substance is oxidized. For this oxidation, the electrochromic substance is bleached. Furthermore, the colored or bleached state of the electrochromic substance is kept for so long as the electric charge is not moved. That is, it has a memory function. This memory function may be effectively utilized if the display electrode DE and the counter electrode CE are in a floating state in which the two switches $SW_1$ and $SW_2$ are not connected to either terminal of the power source E, respectively, after the electrochromic substance is colored or bleached. Also, since current does not flow if the display electrode DE or the counter electrode CE is in a floating condition in which one of the switches $SW_1$ and $SW_2$ is not connected to either terminal of the power source E, the memory condition will be obtained.

However, the above described electrochromic display device has the disadvantage of a low response speed. Due to the low response speed, to obtain a sufficient color contrast, much time is required. Therefore, the device is disadvantageous in that a misreading of the display is apt to occur since characters which are incapable of being read appear at the time of the change of the display content and the correct information cannot be obtained within a short time, especially in the display device for displaying characters, numerals, marks or the like.

An object of the present invention to improve the response speed of the conventional electrochromic display device.

The reason why the response speed, especially the speed of coloration, is low, may be explained as follows.

For producing coloration of the electrochromic substance, when a negative potential with respect to the counter electrode potential is applied to the display electrode, at this time, polarization occurs in the electrochromic display panel so that minus or negative ions are gathered near the counter electrode. As a result, the potential difference between the display electrode and the nearby region of the counter electrode becomes smaller than the applied driving voltage so that it becomes more difficult for current flow in the direction from the counter electrode to the display electrode.

Then, the reactive speed of the reduction of the electrochromic substance is lowered so that the time required for obtaining the desired density for obtaining a sufficient contrast becomes long. That is, the reactive speed becomes slower.

Therefore, it is understood that it is necessary for increasing the reactive speed to promote the current flowing in the direction from the counter electrode to the display electrode. For realizing such a condition, it is required to prevent minus ions from gathering near the counter electrode, to reduce the size of a minus ion layer or region which forms near the counter electrode, or to remove the minus ion layer.

According to the present invention, a remarkable improvement in the response speed of the coloration compared with the conventional one can be attained by a new driving method using an electrochromic display panel having a cell construction which will be hereinafter described.

Figure 3A:
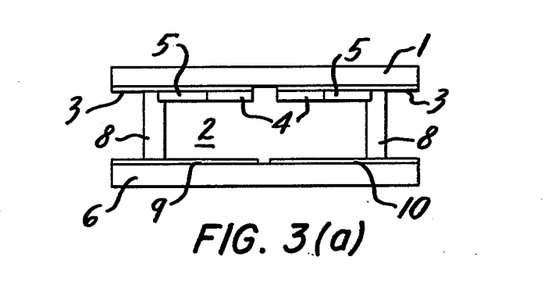
FIGS. 3(a) and 3(b) illustrate a sectional view of an electrochromic display panel of the present invention and an embodiment of a counter electrode of the present invention, respectively.
Figure 3B:
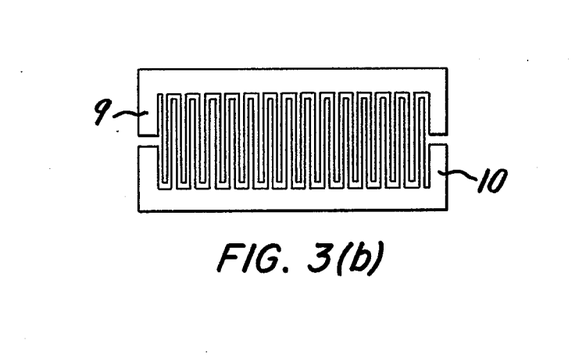

FIG. 3 illustrates a cell construction of the electrochromic display panel of the present invention. Since the electrochromic display panel with the cell construction shown in FIG. 3 differs from the electrochromic display panel shown in FIG. 1 only in the construction of the counter electrode, only the portion of the counter electrode will be described.

The counter electrode consists of a first counter electrode 9 and a second counter electrode 10. For example, the first counter electrode 9 and the second counter electrode 10 are arranged on the same surface of the same substrate 6. These two counter electrodes are formed, for example, in the form of an interdigit as shown in FIG. 3(b). Each counter electrode has a comb-like shape and the two counter electrodes are disposed in opposing interdigit relationship with respect to each other as shown in FIG. 3(b). In such a construction, since the first counter electrode is uniformly arranged relative to the group of display electrodes, a non-uniform phenomenon in the density does not occur due to the difference in the density of coloration among the display electrodes. The operation principle of the above described electrochromic display panel will now be described.

Figure 4:
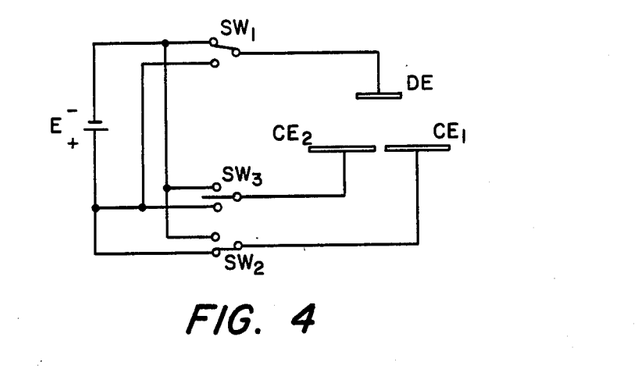
FIG. 4 illustrates a circuit diagram for explaining the principle of the driving operation of the panel according to the present invention.

As in the case of the conventional panel shown in FIG. 2, the panel shown in FIG. 3 can be operated by the use of a single power source. The operation will be described on the basis of the explanatory circuit shown in FIG. 4. To produce coloration in the electrochromic substance, at first, (1) the switch $SW_1$ connected to the display electrode DE is made to switch over to the minus (−) side of the power source E and the switch $SW_2$ connected to the first counter electrode $CE_1$ is made to switch over to the plus (+) side of the power source E in a similar way to the conventional way. At this time, a switch $SW_3$ connected to the second counter electrode $CE_2$ is positioned in a floating state in which the switch $SW_3$ is not connected to either terminal of the power source E. After the coloration operation under the above described state is carried out during the time shorter than the time required for obtaining a sufficient density of the coloration in the display electrode DE, (2) the switch $SW_1$ connected to the display electrode DE is made to open to be in a floating condition. Moreover, the switch $SW_2$ is switched over to the minus side (−) of the power source E and the switch $SW_3$ is switched over to the plus side (+) of the power source E. As a result, the state of the display electrode DE which starts to produce coloration is not changed due to the memory function of the electrochromic substance, and the minus ion layer or region which formed near the first counter electrode $CE_1$ at the time of the operation described in the item (1) is attracted toward a region near the second counter electrode $CE_2$ by the electric field between the second counter electrode $CE_2$ and the electrode $CE_1$ so that the minus ion layer near the first counter electrode $CE_1$ is removed. When the coloration in the display electrode DE is advanced again by repeating the operation (1), the state of the region near the first counter electrode $CE_1$ becomes the state nearly equal to the initial condition so that the current can flow in the same condition as the initial condition. If the operation (1) and the operation (2) are carried out alternatively, the density of coloration of the display electrode DE will be increased to such a degree that a sufficient contrast can be obtained. The operation for removing the minus ion layer or region which tends to form in the vicinity near the counter electrode $CE_1$ by the electric field between the second counter electrode $CE_2$ and the first counter electrode $CE_1$ is hereinafter referred to as a "pumping" operation.

Figure 5:
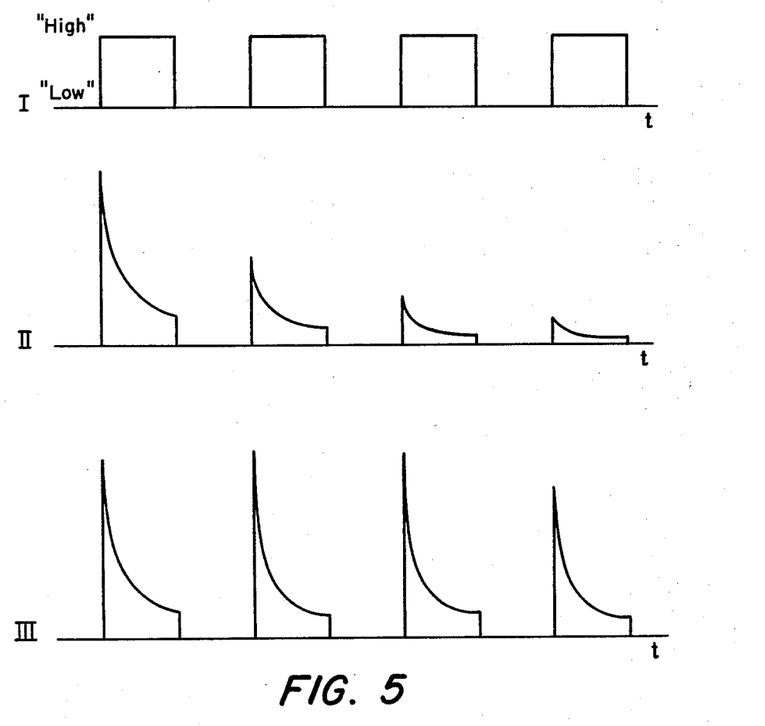
FIG. 5 illustrates current wave form when the electrochromic display panel is coloured.

Considering each current flowing through the display electrode DE at the time of the operation of coloration when the pumping is carried out and when the pumping is not carried out, the current wave forms will be as shown in FIG. 5. FIG. 5 I illustrates a wave form of a write pulse, at a high level of which the display electrode DE is under the operation of coloration and at a low level of which the display electrode DE is in inoperable condition. FIG. 5 II illustrates a wave form of the current flowing through the display electrode DE at the driving operation when the pumping is not effected. FIG. 5 III illustrates a wave form of the current flowing through the display electrode DE at the driving operation when the pumping is effected. Comparing the current wave form shown in FIG. 5 II with that shown in FIG. 5 III, at the first write operation for coloration, the peak current value and the current wave form in the case that the pumping is effected is approximately equal to the peak current and the current wave form in the case that the pumping is not effected, and the speed of coloration in one condition is also approximately equal to that in the other condition. However, it is observed that, after the second write operation, the current value for driving in the case that the pumping is effected is larger than that in the case that the pumping is not effected, and thus more electric charge is transferred in the case that the pumping is effected. It is seen that a difference in the speed of coloration appears after the second pumping. In the case that the pumping is not effected, the current value is remarkably reduced with an increase in the number of driving operations. However, in the case that the pumping is effected, the reduction of the current value is very small and the same current wave form as that at the first driving time can be obtained every time. As described above, it is understood that the pumping serves to recover the current value.

As described above, it is confirmed that more charge flows into the electrochromic substance in the case that the pumping is effected and the pumping serves to increase the speed of reduction for the electrochromic substance.

Figure 6:
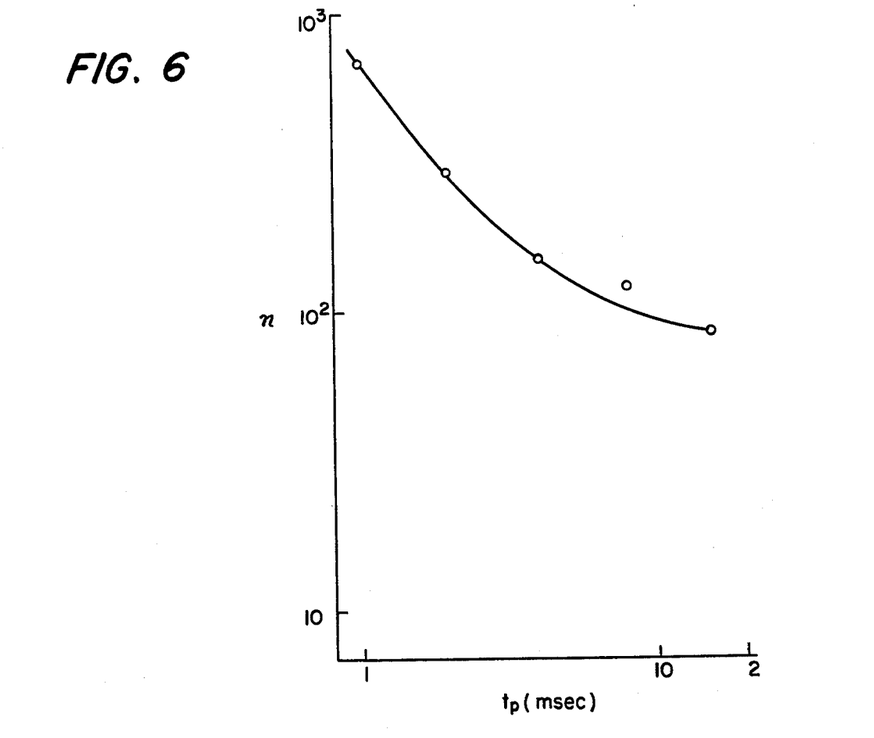
FIG. 6 illustrates a graph to facilitate the understanding of the present invention.

The effect of the pumping depends upon the time length of the pumping. In FIG. 6, the change in the number of pumping operations depending on the time tp (m sec) for the pumping operations is shown. The number n of write pulses at the time when the reflection coefficient of the display electrode becomes 45% relative to the display background is changed in accordance with the pumping time tp (m sec), and the required number n of write pulses may be small as the pumping time tp (m sec) becomes long. The pumping time is set in such a way that the time T (m sec) required for obtaining a predetermined density of coloration becomes the smallest time.

$$T = n \times (tc + tp)(m\ sec) \tag{1}$$

tc ... pulse width of the write pulse (m sec)

According to experiment, T becomes the smallest value when tc is 15.625 (m sec) and tp is 3.9 (m sec), and in the case that the pumping is effected, the time required for coloration of one segment is only a quarter of the pump required in ths case that the pumping is not effected.

Figure 7:
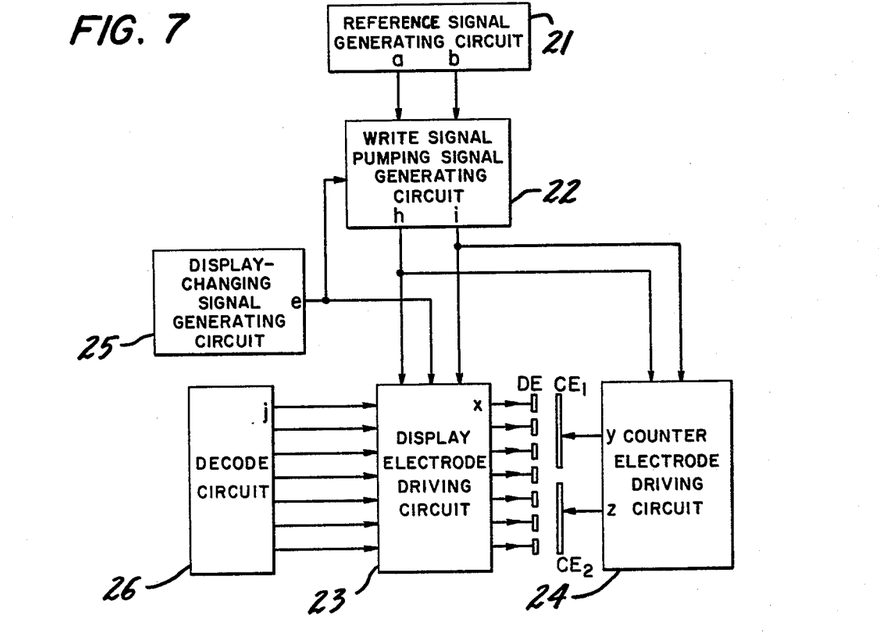
FIG. 7 illustrates a block diagram of an embodiment of a driving circuit of the present invention.

A driving circuit for carrying out the driving operation including the pumping will be described hereinafter. FIG. 7 is a block diagram of a driving circuit of the present invention. A write signal/pumping signal generating circuit 22 is connected to a reference signal generating circuit 21 having a frequency dividing circuit, and the write signal/pumping signal generating circuit 22 is connected to a display electrode driving circuit 23 and a counter electrode driving circuit 24. However, a display-changing signal generating circuit 25 and a decode circuit 26 are connected to the display electrode driving circuit 23, and a group of output terminals of the display electrode driving circuit 23 is connected to a group of display electrodes DE. Two output terminals of the counter electrode driving circuit 24 are connected to a first counter electrode $CE_1$ and to a second counter electrode $CE_2$, respectively. A write pulse width limiting signal A is produced from an output terminal a of the reference signal generating circuit 21, and a pumping pulse width limiting signal B is produced from an output terminal b thereof. The write signal/pumping signal generating circuit 22 receives the signal A and the signal B, and produces a write/erase pulse signal H and a pumping signal I to control the display electrode driving circuit 23 and the counter electrode driving circuit 24 which apply a voltage to the electrode connected thereto by a display-changing signal E from the display-changing circuit 25 and a signal from the decode circuit 26.

The write signal/pumping signal generating circuit 22, the display electrode driving circuit 23 and the counter electrode driving circuit 24 will be now described in more detail.

Figure 8:
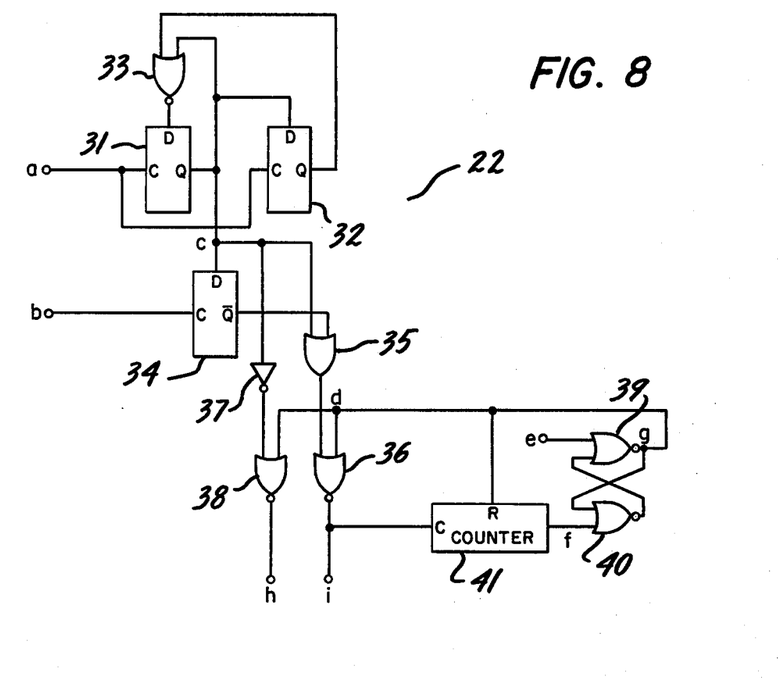
FIG. 8 illustrates a circuit diagram of an embodiment of a writing signal/pumping pulse signal generating circuit.

FIG. 8 illustrates a circuit arrangement of the write signal/pumping signal generating circuit 22. This circuit consists of a ring counter comprised of a D type flip-flop 31, a D type flip-flop 32 and a two-input NOR gate 33, and the output signal A from the reference signal generating circuit 21 is applied to clock input terminals C of the D type flip-flop 31 and the D type flip-flop 32. A Q output terminal of the D type flip-flop 31 is connected to a D input terminal of the D type flip-flop of the subsequent stage and to one input terminal of the two-input NOR gate 33, and a Q output terminal of the D type flip-flop 32 is connected to the other input terminal of the two-input NOR gate 33. Moreover, an output terminal of the two input NOR gate is connected to a D input terminal of the D type flip-flop 31. The circuit 23 has also a D type flip-flop 34 in which the Q output terminal of the D type flip-flop 31 is connected to a D input terminal thereof and the output signal B from the reference signal generating circuit 21 is applied to a clock input terminal C thereof, a two-input OR gate 35 to input terminals of which a Q output terminal of the flip-flop 34 and the Q output terminal of the D type flip-flop 31 are connected, respectively, a two-input NOR gate 36 which is connected to an output terminal of the OR gate 35 and to an output terminal of a two-input NOR gate 39 which comprises part of a R-S flip-flop together with a two-input NOR gate 40, and a counter in which an output terminal of the NOR gate 36 is connected to a clock input terminal C of the counter and the output terminal of the NOR gate of the R-S flip-flop is connected to a reset terminal R of the counter. In the two-input NOR gates 39, 40 of the R-S flip-flop, the output terminal of the NOR gate is connected to one input terminal of the NOR gate 40 an output terminal of which is connected to one input terminal of the NOR gate 39, and the output signal E from the display-changing signal generating circuit 25 is applied to the other input terminal of the NOR gate 39. An output terminal of the counter 41 is connected to the other input terminal of the NOR gate 40. There is provided with a two-input NOR gate 38 to which the output from the NOR gate 39 of the R-S flip-flop and an output from a NOT gate 37 which is connected to the Q output terminal of the D type flip-flop 31 are applied. The write signal H is produced from the NOR gate 38 and the pumping signal I is produced from the NOR gate 36.

Figure 9:
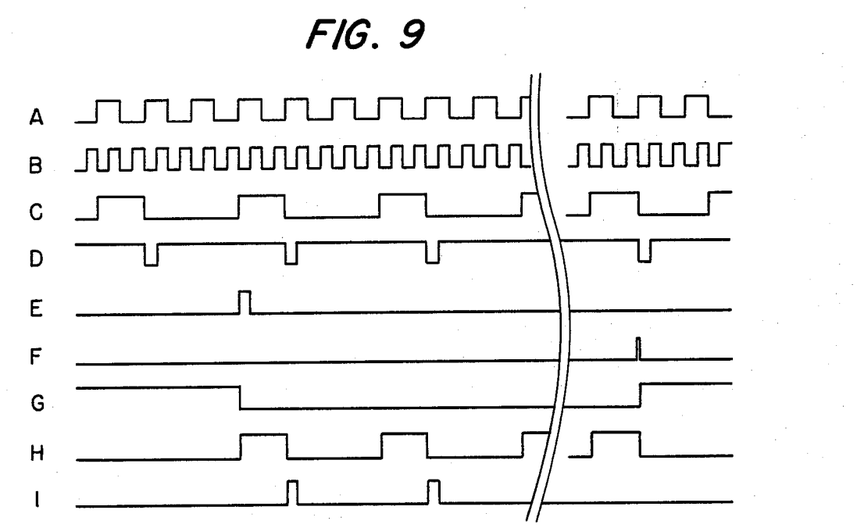
FIG. 9 illustrates a timing chart for the generating circuit.

The operation of the above described circuit will now be described using each of the output wave forms shown in FIG. 9.

The signal A comprises a clock signal for the ring counter has a period which is equal to the pulse width of the write signal C. A period of the signal B is equal to twice time of a pulse width tp of the pumping pulse and the duty ratio of the signal B is ½. The Q output signal from the D type flip-flop 31 of the ring counter operated by the application of the signal A is a signal C of FIG. 9. In this embodiment the period of the signal C is 3tc and the duty ratio of the signal C is ⅓. The signal C is delayed by a half of period of the signal B, that is, by tp, by the use of the D type flip-flop 34, and the signal D is produced from the two-input OR gate. When the R-S flip-flop is in a reset condition and an output signal G of the NOR gate 39 is high, the NOR gates 36 and 38 are closed so that output signals I and H of the NOR gate 36 and 38 become low. When the output signal E of the display-changing signal generating circuit 25 becomes high at this time, the R-S flip-flop is set and the output signal G of the NOR gate 39 becomes low. When the signal G becomes low, each of the NOR gates 36 and 38 is opened to produce the signal H having the same phase as that of the signal C from the NOR gate 38, and the NOR gate 36 produces an inverted signal I of the signal D. The inverted signal I drives the counter 41. When the predetermined number of pulses are counted by the counter 41, an output signal F of the counter 41 becomes high to reset the R-S flip-flop and the output signal G of the NOR gate 39 becomes high. As a result, the counter is reset, and the NOR gates 36 and 38 are closed so that the output signals H and I of the NOR gate 38 and 36 become low. As described above, in the circuit shown in FIG. 8, the repetitive number of writings required for one writing operation is decided, and furthermore, the write pulse width tc, the pumping pulse width tp and the erase pulse width are also decided. Each timing of the write pulse and the pumping pulse is also determined. The repetitive number, the write pulse width and the pumping pulse width are properly set on the basis of the density of coloration or the total time T.

The display electrode driving circuit 23 and the counter electrode driving circuit 24 will now be described in more detail.

Figure 10:
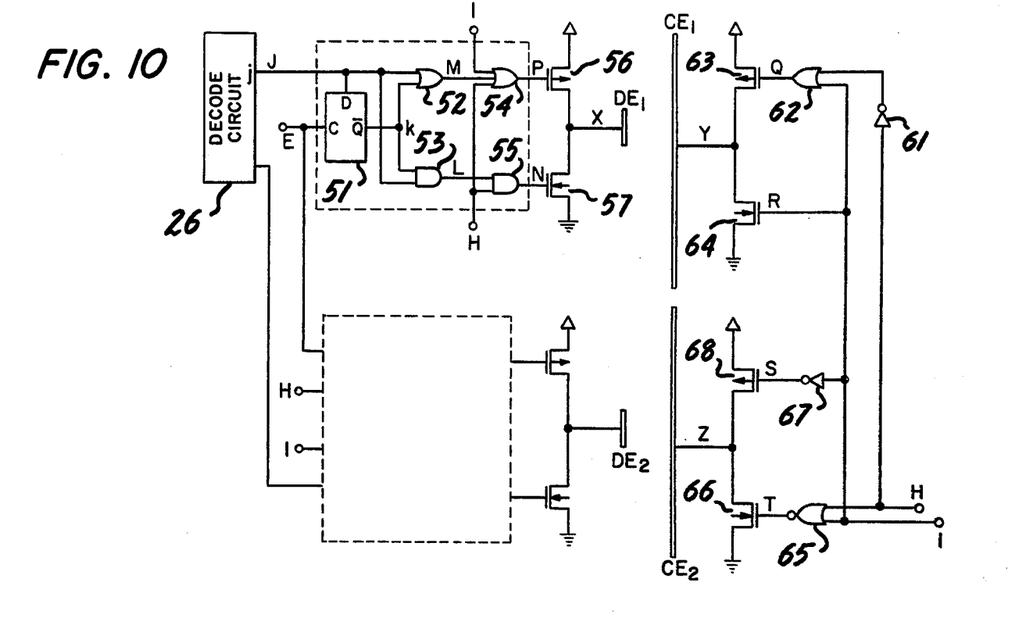
FIG. 10 illustrates a circuit diagram of an embodiment of a driving circuit.

One example of a circuit arrangement of the display electrode driving circuit 23 and the counter electrode driving circuit 24 is shown in FIG. 10 and the description is hereinafter made in conjunction with FIG. 10. The arrangement of the display electrode driving circuit will be described.

The circuit has a D type flip-flop 51 a D input terminal of which is connected to a j terminal of output terminals of the decode circuit 26, and a two-input OR gate 52 and a two-input AND gate 53 each having one input terminal thereof connected to a Q output terminal of the D type flip-flop 51 and each having the other input terminal thereof connected to the j terminal of the decode circuit 26. The circuit also has an OR gate 54 to which the output from the OR gate 52, the output signal H from the write signal/pumping signal generating circuit 22 and the signal I are applied, a two-input AND gate 55 to which an output signal of the two-input AND gate 53 and the signal H are applied, a P-channel MOS FET 56 a gate electrode of which is connected to the output terminal of the three-input OR gate 54, and an N-channel MOS FET 57 a gate electrode of which is connected to an output terminal of the two-input AND gate 55. A drain electrode of the N-channel MOS FET 57 is connected to the display electrode $CE_1$. A source electrode of the P-channel MOS FET 56 is connected to the plus terminal (+) and a source electrode of the N-channel MOS FET 57 is grounded. The output signal E from the display-changing circuit 25 is applied to the clock input terminal C of the D type flip-flop 51. Next, the arrangement of the counter electrode driving circuit will be described.

The counter electrode driving circuit consists of a first counter electrode driving circuit and a second counter electrode driving circuit. The first counter electrode driving circuit has a two-input OR gate 62 and one input terminal thereof is connected to an output terminal of a NOT gate 61 to which the signal H is applied and the signal I is applied to the other input terminal of the gate 62. An output terminal of the OR gate 62 is connected to a gate electrode of a P-channel MOS FET 63, and the signal I is applied to a gate electrode of an N-channel MOS FET 64. Each drain electrode of the MOS FETs 63 and 64 is connected to the counter electrode $CE_1$. The second counter electrode driving circuit has an N-channel MOS FET a gate electrode of which is connected to an output terminal of a two-input NOR gate 65 to which the signal H is applied to one input terminal thereof and the signal I is applied to the other input terminal of the NOR gate 65. An output terminal of a NOT gate 67 to which the signal I is applied is connected to a gate electrode of a P-channel MOS FET 68, and each drain electrode of the MOS FETs 67 and 68 is connected to the second counter electrode $CE_2$.

Figure 11:
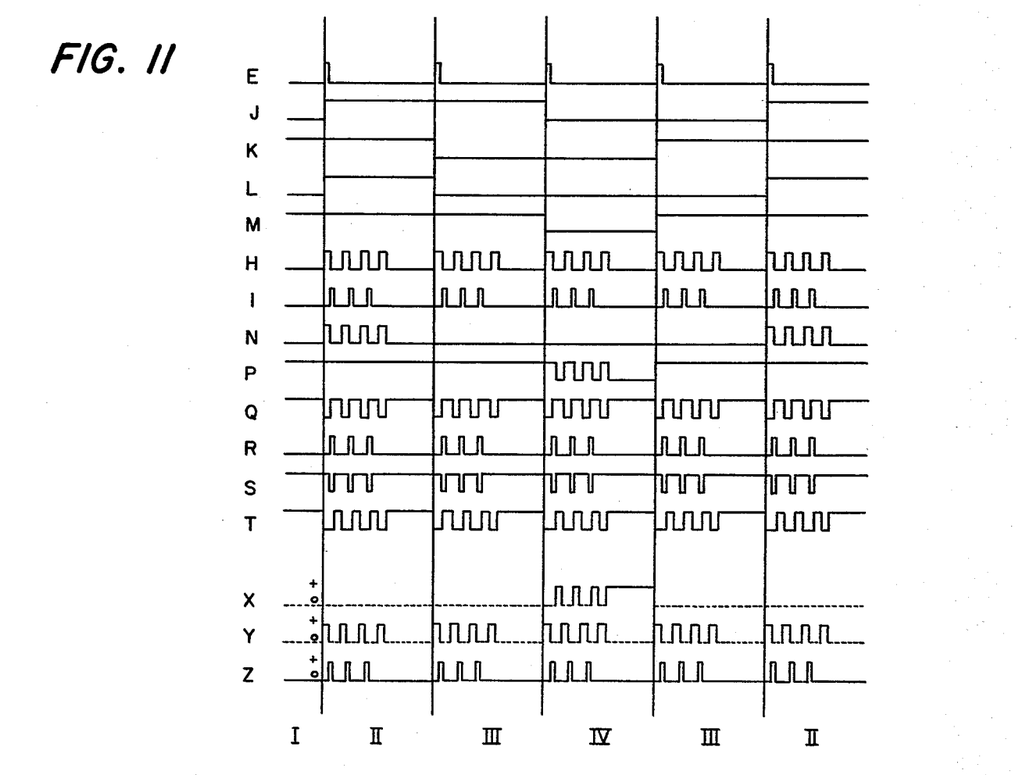
FIG. 11 illustrates a timing chart for the driving circuit shown in FIG. 10.

The operation of the above described driving circuit will be described using the timing chart of each portion shown in FIG. 11.

When the output signal J of the decode circuit 26 is low, that is, when the decode circuit 26 produces a "putting out" signal (region I), the display-changing signal E becomes high. When the decode signal J of the decode circuit becomes high at this time, that is, when the decode circuit produces a "lighting" signal, since the Q output signal K of the D type flip-flop 51 is still kept low, an output signal M which is a result signal of an OR operation among the decode signal J and the Q output signal K is still kept high and an output signal L which is a result signal of an AND operation among the decode signal J and the Q output signal K is changed in its level condition from a low level to a high level. Then, the OR gate 54 is closed and the AND gate 55 is opened. The output signal of the OR gate 54 is high so that the P-channel MOS FET 56 is turned off. The output signal N from the AND gate 55 produces a signal whose phase is the same as that of the write signal H. As a result, a voltage wave form X is applied to the display electrode $DE_1$. The broken line in FIG. 11 is indicative of a floating condition. At this time, the counter electrode driving circuit applies a voltage wave form Y to the first counter electrode $CE_1$ and applies a voltage wave form Z to the second counter electrode $CE_2$. When the applied voltage to the display electrode is zero volts, the polarity of the applied voltage to the first counter electrode $CE_1$ is plus and the second counter electrode $CE_2$ is in a floating condition. At this timing, the coloration of the display electrode is advanced. Moreover, the first counter electrode $CE_1$ has the function of a counter electrode for writing. When the applied voltage to the display electrode DE becomes the voltage corresponding to a floating condition, the voltage of the first counter electrode $CE_1$ becomes zero volts and the voltage of the second counter electrode $CE_2$ becomes a positive voltage to carry out the pumping. Next, although the first counter electrode $CE_1$ assumes a floating condition and the voltage of the second counter electrode $CE_2$ becomes zero volts, since the display electrode $DE_1$ is in a floating condition, the erase operation is not carried out. Repeating the operation described above a predetermined number of times produces a predetermined density of coloration of the display electrode $DE_1$ (region II).

If the decode signal J is still high level when the display-changing signal E comes to a high level again, the Q output signal K of the D type flip-flop 51 becomes low level and both the OR gate 52 and the AND gate 53 are closed. As a result, both the OR gate 54 and the AND gate 55 are also closed so that a high level signal is applied to the P-channel MOS FET 56 and a low level signal is applied to the N-channel MOS FET, and both MOS FETs are turned off. The display electrode $DE_1$ is in a floating condition (region III), that is, in a memory mode.

When the display-changing signal E becomes a high level again and the decode signal J is changed into a low level, the Q output signal K of the D type flip-flop 51 becomes a low level so that the OR gate 52 is opened and the AND gate 53 is closed. Therefore, since the AND gate 55 is closed and the voltage of zero volts is applied to the gate electrode of the N-channel MOS FET 57, the N-channel MOS FET 55 is turned off. Since the signal P is applied to the gate electrode of the P-channel MOS FET 56, the output voltage to the display electrode $DE_1$ becomes a voltage X shown in FIG. 11. Since the voltage Y is applied to the counter electrode $CE_1$, the state of the display electrode $DE_1$ is changed from the coloration state to the bleached state (region III).

In the electrochromic display device of the present invention in which the pumping is carried out between the first counter electrode and the second counter electrode, the speed for coloration can be remarkably increased. As a result, the time required for changing the display content becomes short so that good display operation can be attained.

What is claimed:

1. An electrochromic display device comprising: an electrolyte held between two substrates at least one of which is transparent; a display electrode formed on a surface of one of said substrates and including an electrochromic substance film, said surface being in contact with said electrolyte; a first counter electrode formed on a counter surface of the other of said substrates, said counter surface being spaced from and facing said display electrode; a second counter electrode formed on a face of one of said two substrates, said face being in contact with said electrolyte; means for selectively applying a voltage between said display electrode and said first counter electrode to effect the coloration of said display electrode; means for selectively intermittently applying a voltage between said first counter electrode and said second counter electrode to effect removal of a minus ion layer which forms in the vicinity near said first counter electrode; and means for alternately changing the application of the voltage from between said display electrode and said first counter electrode to the application of the voltage between said first counter electrode and said second counter electrode.

2. An electrochromic display device as claimed in claim 1; wherein said first counter electrode and said second counter electrode are formed on the same surface of the same substrate, the two counter electrodes having a comb-like shape.

3. An electrochromic display device as claimed in claim 1; wherein said first counter electrode comprises the electrode for effecting the coloration of at least the display electrode; and further comprising a control circuit and a driving circuit for applying the voltage between said first counter electrode and said second counter electrode in such a way that said first counter electrode is at a negative potential and said second counter electrode is at a positive potential.

4. A method for driving an electrochromic display device comprised of an electrolyte held between two substrates at least one of which is transparent; a display electrode formed on a surface of one substrate and having an electrochromic substance film, said surface being in contact with said electrolyte; a first counter electrode formed on a counter surface of the other substrate, said counter surface being spaced from and facing said display electrode; a second counter electrode formed on a face of one of the two substrates, said face being in contact with said electrolyte; and means for intermittently applying a voltage between said first counter electrode and said second counter electrode, said method comprising the steps of: applying a voltage between said display electrode and said first electrode to effect the coloration of said display electrode accompanied by formation of a minus ion layer in the vicinity near the first counter electrode; electrically floating said display electrode after coloration thereof; and then applying a voltage between said first counter electrode and said second counter electrode to remove a minus ion layer which forms in the vicinity near said first counter electrode.

5. In an electrochromic display device having an electrolyte contained between two spaced-apart substrates: a set of display segments disposed on the surface of one substrate and in contact with the electrolyte, each display segment comprised of a display electrode and an electrochromic substance; a first counter electrode disposed on the surface of the other substrate and in contact with the electrolyte; a second counter electrode disposed on the surface of one of the two substrates and in contact with the electrolyte; first voltage applying means for selectively applying a voltage between preselected display electrodes and the first counter electrode to effect coloration of the preselected display electrodes accompanied by formation of a negative ion region in the electrolyte in the vicinity near the first counter electrode; and second voltage applying means for selectively applying a voltage between the first counter electrode and the second counter electrode to establish an electric field between the first and second counter electrodes effective to remove the negative ion region thereby increasing the coloration response speed of the electrochromic display device.

6. An electrochromic display device according to claim 5; wherein the second voltage applying means includes means for intermittently applying the voltage between the first counter electrode and the second counter electrode.

7. An electrochromic display device according to claim 5 or claim 6; including circuit means for rendering the first and second voltage applying means operable to apply voltage is alternate periods.

8. An electrochromic display device according to claim 7; wherein the first and second counter electrodes are both disposed on the same surface of the same substrate.

9. An electrochromic display device according to claim 8; wherein the first and second counter electrodes each have a comb-like shape and are disposed in opposing interdigit relationship with respect to each other.

10. An electrochromic display device according to claim 5; wherein the first and second counter electrodes are both disposed on the same surface of the same substrate.

11. An electrochromic display device according to claim 10; wherein the first and second counter electrodes each have a comb-like shape and are disposed in opposing interdigit relationship with respect to each other.

* * * * *